Jan. 16, 1962  R. M. DILLE ETAL  3,016,986
PRODUCTION OF CARBON MONOXIDE AND HYDROGEN
Filed May 29, 1958
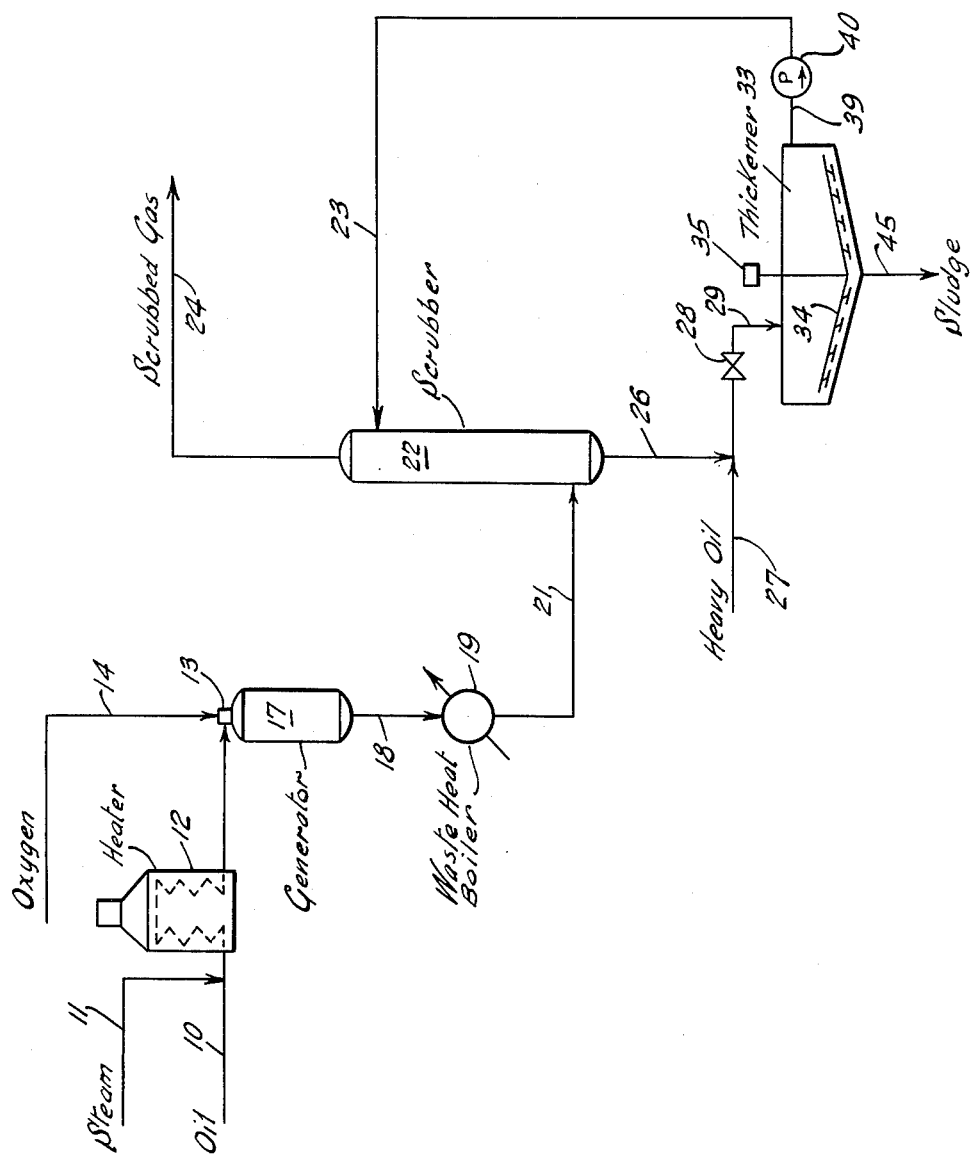

United States Patent Office 3,016,986
Patented Jan. 16, 1962

3,016,986
PRODUCTION OF CARBON MONOXIDE AND HYDROGEN
Roger M. Dille and Ronald W. Chapman, Whittier, and John C. Ahlborn, Monterey Park, Calif., assignors to Texaco Inc., a corporation of Delaware
Filed May 29, 1958, Ser. No. 738,841
2 Claims. (Cl. 183—121)

This invention relates to a process for the production of carbon monoxide and hydrogen from fossil fuels by reaction with oxygen. In one of its more specific aspects it is directed to a method of separating carbonaceous solid entrained in the gaseous products of reaction of fossil fuels and oxygen wherein said products are scrubbed with water, scrubbing water containing dispersed carbonaceous solid is contacted with a low gravity liquid hydrocarbon effecting coalescence of the carbonaceous solid, and said coalesced carbon is allowed to settle effecting clarification of the water.

The partial oxidation of fossil fuels is a highly economic method of producing mixtures of carbon monoxide and hydrogen, referred to as synthesis gas. In the partial oxidation process, a fossil fuel, for example, coal, petroleum oil, or natural gas, is reacted with an oxygen-containing gas in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and relatively small amounts of water vapor, carbon dioxide, and entrained carbonaceous solid. The carbonaceous solid is in the form of very fine carbon particles, and upon separation is useful as carbon black.

The amount of uncombined oxygen supplied to the reaction zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of this purity is generally preferred.

Product gases issuing from the gas generation step contain a large amount of sensible heat. This heat may be employed to convert water to steam. If the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases in indirect heat exchange through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon is effectively removed from the product gases by contacting the cooled synthesis gas with water in gas-liquid contact apparatus, for example, spray towers, bubble towers, baffle towers or packed towers. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 1 percent. However, efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding carbon separating steps, and delivers the product gas for use with a minimum of compression.

The carbon produced in the partial oxidation of fossil fuels typically has a mean particle diameter of about 40 millimicrons. These particles appear to contain some chemisorbed oxygen rendering them easily wet by the scrubbing water. These particles, dispersed in water, settle very slowly until a carbon concentration of about 3 percent by weight is reached, after which no further concentration by gravity occurs.

The oil absorption value of carbon produced in the partial oxidation of fossil fuels typically varies within the range of about 0.2 to 5.0 cubic centimeters per gram, equivalent to about 2.4 to 60 gallons per hundred pounds. Oil absorption value is a criterion of the amount of oil necessary to wet a particular sample of carbon. The oil absorption value is determined by adding increments of alkali-refined linseed oil to a 1.00 gram sample of carbon, and mixing with a spatula between each addition until a single coherent ball of paste is formed which does not break down after forming. Procedure described in detail in ASTM test D281–31. The oil absorption value is the number of cubic centimeters of oil added. Oil absorption value may be expressed as cubic centimeters per gram or may be converted to units of gallons per hundred pounds by applying a factor of 12. When oil is added to carbon from the partial oxidation process, the carbon appears to remain dry until the amount of oil approaches the oil absorption value. When an amount of oil equal to the oil absorption value has been added, the carbon appears oil-wet and the individual particles adhere to each other forming aggregates or conglomerates having a consistency of a stiff paste. Upon further addition of oil, this thick paste is transformed successively to a gum-like mass, then a semi-fluid mass and finally upon addition of an amount of oil in excess of about four times the oil absorption value, the mixture becomes a slurry of carbon in liquid hydrocarbon. We have found that when the scrubbing water-carbon dispersion is contacted with a heavy oil in an amount less than ½ the oil absorption value, the oil appears to be absorbed upon the surface of the carbon but there appears to be little change in the separating characteristics of the water-carbon dispersion. When a heavy oil having a gravity of about 10° API or lower is employed, the coalesced particles of oil and carbon have a density greater than water and the particles settle to the bottom of clarified water. In accordance with this invention, the scrubbing water dispersion is contacted with an amount of heavy oil in excess of the oil absorption value effecting coalescence of the oil and carbon into particles or agglomerates having an apparent density greater than water. Preferably the heavy oil addition rate is maintained within the range of about one and one half to 20 times the oil absorption value of the carbon in the water dispersion. At rates within the range of about one and one half to about 4 times the oil absorption value, the oil-carbon mixture is separated as a sludge, and at rates of about 5 to 20 times the oil absorption value, the oil-carbon mixture forms a pumpable slurry.

Carbon from the partial oxidation process typically has an effective density in oil of about 1.8 grams per cubic centimeter. Heavy oils, for example, cracked residua, crude residua and bunker fuel oils, having gravities less than 10° API form mixtures or conglomerates with carbon having densities greater than water in all proportions. Oil-carbon agglomerates having apparent densities greater than water may be formed with oils having densities less than water, that is, gravities in the range of about 10 to 20° API, when the amount of oil in the agglomerate is insufficient to counterbalance the denser carbon. However, we prefer to employ oils having densities greater than water, that is, gravities below 10° API, so that the formation of a floating oil phase is avoided.

Contacting of the oil and water dispersion may be effected with a mixing valve, pump, orifice, nozzle, propeller mixer, or turbine mixer. Entrapment of air or vapors by the solid particles is avoided by contacting the oil and water dispersion out of contact with air or vapor. Advantageously the oil and water dispersion are contacted at about the temperature and pressure of the scrubbing zone. High temperature facilitates phase separation and reduces the viscosity of the carbon sludge. Upon coalescence, the oil-wet carbon particles rapidly settle and clarified water may be separated for reuse by decantation. The settling and separation may be effected in sedimentation, clarification, or thickening apparatus well known in the art, for example, settling cones or raked thickeners. Hot clarified water is continuously removed as overflow for recycle. Carbon-oil sludge is continuously removed as underflow for use as fuel or otherwise. Alternatively, the water and coalesced carbon may be directed to a settling pond where the oil-carbon agglomerates are permitted to accumulate as a sludge on the bottom and clarified water is decanted for recycle or may be discharged as overflow without danger of stream pollution. Periodically, the settling pond may be excavated or dredged to remove accumulated sludge for use or disposal.

When ash-containing fossil fuels, for example, coal, are used for the production of carbon monoxide and hydrogen, it is generally desirable to separate at least a part of the ash from the reaction products. Removal of the ash increases the utility and value of the carbon which is separately recovered and facilitates the clarification of the carbon-containing scrubbing water. A large part of the ash is easily removed in a quench zone wherein the products are cooled by direct contact with water and the molten ash converted to a sand-like solid slag which settles to the bottom of the quench zone and may be withdrawn through lock hoppers. The quenched gas containing entrained carbon and fine slag is then contacted with water in a scrubbing zone to effect removal of substantially all of the solids from the gas forming a dispersion of solid in the scrubbing water. The scrubbing water dispersion is then passed to one or more settlers where the relatively coarse and dense slag particles are settled and the water containing dispersed carbon particles is withdrawn. The carbon-water dispersion is then contacted with heavy oil as described above to effect clarification of the water and separation of carbon.

An advantage of the process of this invention is that carbon is effectively and efficiently removed from synthesis gas.

Another advantage of the process of this invention is that the carbon formed in the manufacture of synthesis gas is separated in a form suitable for use as fuel.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described.

Oil in line 10 is admixed with steam from line 11 and the mixture passed through heater 12 to gas generator burner 13. Oxygen in line 14 is admixed with the steam-oil mixture in burner 13. The steam, oil and oxygen react in gas generator 17 at an autogenous temperature of about 2800° F. and 300 p.s.i.g. to produce a synthesis gas comprising carbon monoxide and hydrogen. Additionally, the synthesis gas contains entrained carbon amounting to about 2 percent of the carbon content of the oil feed. Hot synthesis gas from gas generator 17 is withdrawn through line 18 and passed to waste heat boiler 19 where the synthesis gas is cooled by the generation of steam. The cooled synthesis gas is passed through line 21 to scrubber 22 where the synthesis gas and entrained carbon is contacted in countercurrent flow with scrubbing water introduced through line 23. Synthesis gas substantially free of entrained carbon is withdrawn through line 24 and discharged for utilization not shown.

Scrubbing water comprising about 1 percent dispersed carbon is withdrawn from scrubber 22 through line 26 at a temperature of about 270° F. The scrubbing water-carbon dispersion is contacted with 9.7° API bunker fuel oil from line 27 in an amount equal to two times the oil absorption value of the carbon, and the combined stream passed through mixing valve 28. A pressure drop of about 30 pounds per square inch across mixing valve 28 effects high turbulence and mixing of the water, carbon, and bunker fuel. The mixture then passes through lines 29, to thickener 30. Thickener 30 comprises a settling tank with a sloping bottom and a rake 34 driven by motor 35.

Clarified water overflows from thickener 33 through line 39 and is recycled by pump 40 through line 23 to scrubber 22. Carbon sludge, underflow from thickener 33 is withdrawn through line 45 to storage or use not shown.

*Example*

Synthesis gas is produced by the partial oxidation of a bunker fuel oil at a temperature of 2600° F. and at 250 pounds per square inch gauge. In the generation of the synthesis gas, 2 percent of the carbon content of the fuel oil is unconverted to gaseous products and appears as entrained carbon in the product gas. The entrained carbon has an oil absorption value of 2.3 cubic centimeters per gram (27.6 gallons per hundred pounds). The hot synthesis gas is cooled to 400° F. and steam is generated by passing the synthesis gas through a waste heat boiler.

The cooled gas is scrubbed with water in a scrubber maintained at 248 pounds per square inch gauge. Scrubbing water containing 1 percent entrained carbon is withdrawn at a temperature of 265° F. The scrubbing water is contacted with bunker C fuel oil having a gravity of 9.6° API at a combined temperature of 261° F. and at a rate of 3.6 pounds per pounds of entrained carbon (43.2 gallons per hundred pounds). The mixture of scrubbing water, carbon, and fuel oil at 248 pounds per square inch gauge is thoroughly mixed by passing through a valve which discharges to a separating tank maintained at 25 pounds per square inch gauge pressure. Clear water is separated from the top of the tank and a sludge of carbon and bunker C fuel oil accumulates in the bottom of the tank.

Obviously many modifications and variations of the invention, as hereinbefore set forth, may be made without departing from the spirit and scope thereof and only such limitations should be imposed as are indicated in the appended claims.

We claim:

1. A method for recovering carbonaceous solid as a flowable mixture with a hydrocarbon oil from a product gas stream comprising carbon monoxide, hydrogen and entrained carbonaceous solid resulting from the reaction of a carbonaceous fuel with oxygen, said solid having an oil absorption value within the range of about 2.4 to 60 gallons per hundred pounds which method comprises contacting said product gas stream with water in a gas scrubbing zone to effect removal of carbonaceous solid entrained therein from said gas stream and to form a dispersion of carbonaceous solid in water, contacting said dispersion with a heavy hydrocarbon liquid having a gravity less than 10° API in an amount within the range of 1.5 to 20 times the oil absorption value of said carbonaceous solid in a mixing zone to effect transfer of carbonaceous solid form said dispersion to said heavy hydrocarbon liquid to form an oil-carbonaceous solid mixture having an apparent density greater than water effecting resolution of said dispersion into clarified water and a flowable oil-carbonaceous solid mixture and separating said clarified water and said flowable mixture by sedimentation.

2. The method of claim 1 wherein said dispersion is contacted with a heavy hydrocarbon liquid at a rate of at least five times the oil absorption value of the carbon contained in said dispersion whereby the flowable oil-carbonaceous solid mixture is in the form of a pumpable slurry.

References Cited in the file of this patent

UNITED STATES PATENTS

| | | |
|---|---|---|
| Re. 22,454 | Weigand | Mar. 7, 1944 |
| 736,381 | Glogner | Aug. 18, 1903 |
| 1,955,065 | Hawley | Apr. 17, 1934 |
| 2,226,532 | Hawley | Dec. 31, 1940 |
| 2,587,107 | Cade | Feb. 26, 1952 |
| 2,665,980 | Carkeek | Jan. 12, 1954 |
| 2,677,439 | Hedberg | May 4, 1954 |
| 2,746,564 | Williams | May 22, 1956 |
| 2,781,246 | Goldtrap | Feb. 12, 1957 |
| 2,793,938 | Frank | May 28, 1957 |
| 2,903,423 | Mondria et al. | Sept. 8, 1959 |

OTHER REFERENCES

Convertal Process of Coal Slurry Treatment, Bureau of Mines Information Circular 7660.

UNITED STATES PATENT OFFICE

CERTIFICATE OF CORRECTION

Patent No. 3,016,986 January 16, 1962

Roger M. Dille et al.

It is hereby certified that error appears in the above numbered patent requiring correction and that the said Letters Patent should read as corrected below.

Column 6, line 3, for "form" read -- from --.

Signed and sealed this 15th day of May 1962.

(SEAL)
Attest:

ERNEST W. SWIDER
Attesting Officer

DAVID L. LADD
Commissioner of Patents